(12) United States Patent
Tu et al.

(10) Patent No.: US 11,804,237 B2
(45) Date of Patent: Oct. 31, 2023

(54) CONFERENCE TERMINAL AND ECHO CANCELLATION METHOD FOR CONFERENCE

(71) Applicant: Acer Incorporated, New Taipei (TW)

(72) Inventors: Po-Jen Tu, New Taipei (TW); Jia-Ren Chang, New Taipei (TW); Kai-Meng Tzeng, New Taipei (TW)

(73) Assignee: Acer Incorporated, New Taipei (TW)

( * ) Notice: Subject to any disclaimer, the term of this patent is extended or adjusted under 35 U.S.C. 154(b) by 142 days.

(21) Appl. No.: 17/474,077

(22) Filed: Sep. 14, 2021

(65) Prior Publication Data
US 2023/0058981 A1    Feb. 23, 2023

(30) Foreign Application Priority Data
Aug. 19, 2021   (TW) .................. 110130678

(51) Int. Cl.
*G10L 21/0364*     (2013.01)
*G10L 21/0208*     (2013.01)
(Continued)

(52) U.S. Cl.
CPC ........ *G10L 21/0364* (2013.01); *G10L 19/018* (2013.01); *G10L 21/0208* (2013.01); *H04N 7/15* (2013.01); *G10L 2021/02082* (2013.01)

(58) Field of Classification Search
CPC .... G06F 21/16; G06F 21/602; G06F 21/0364; G06F 21/32; G10K 11/1785; G10H 1/368; G10L 13/033; G10L 15/26; G10L 19/018; G10L 19/0208; G10L 19/032; G10L 21/013; G10L 21/0208; G10L 21/0264; G10L 21/0364; G10L 25/84; G10L 2021/02082; G10L 13/02; G10L 13/04; G10L 13/047; G10L 13/08; G10L 13/10; G10L 19/08; G10L 19/125; G10L 21/003;
(Continued)

(56) References Cited

U.S. PATENT DOCUMENTS 5,991,385 A * 11/1999 Dunn ................. H04M 3/568
                                                    381/1
8,682,658 B2 * 3/2014 Vitte ................. G10L 21/0208
                                                    704/211
(Continued)

FOREIGN PATENT DOCUMENTS

CN      106716527      5/2017
CN      106165015      3/2020
(Continued)

*Primary Examiner* — Gerald Gauthier
(74) *Attorney, Agent, or Firm* — JCIPRNET

(57) ABSTRACT

A conference terminal and an echo cancellation method for a conference are provided. In the echo cancellation method, a synthetic speech signal is received. The synthetic speech signal includes a user speech signal of a speaking party corresponding to a first conference terminal of multiple conference terminals and an audio watermark signal corresponding to the first conference terminal. One or more delay times corresponding to the audio watermark signal are detected in a received audio signal. The received audio signal is recorded through a sound receiver of a second conference terminal of the conference terminals. An echo in the received audio signal is canceled according to the delay time.

14 Claims, 4 Drawing Sheets

(51) Int. Cl.
*H04N 7/15* (2006.01)
*G10L 19/018* (2013.01)

(58) Field of Classification Search
CPC . H03G 9/025; H04B 3/21; H04B 3/23; H04B 3/238; H04L 12/66; H04L 65/4038; H04L 65/1104; H04M 1/20; H04M 1/7245; H04M 3/002; H04M 3/566; H04M 3/568; H04M 9/08; H04M 9/082; H04N 7/15; H04N 19/467; H04Q 11/00; H04R 3/005; H04R 3/02; H04R 27/00; H04R 1/406; G06N 3/045; G06Q 20/322; G06T 1/005; H04H 60/27
See application file for complete search history.

(56) References Cited

U.S. PATENT DOCUMENTS

| | | | | |
|---|---|---|---|---|
| 8,903,721 | B1* | 12/2014 | Cowan | H04R 3/005 704/226 |
| 8,958,571 | B2* | 2/2015 | Kwatra | H04M 1/20 381/313 |
| 9,037,458 | B2* | 5/2015 | Park | G10K 11/17857 704/226 |
| 9,210,270 | B2* | 12/2015 | Leviant | H04M 9/082 |
| 9,282,195 | B2* | 3/2016 | Xue | H04M 9/082 |
| 9,787,844 | B2 | 10/2017 | Rey | |
| 9,928,847 | B1* | 3/2018 | Cleve | H04M 3/002 |
| 10,109,286 | B2* | 10/2018 | Tachibana | G10L 13/033 |
| 10,122,863 | B2* | 11/2018 | Zargar | H04B 3/21 |
| 10,827,075 | B2* | 11/2020 | Kawai | H04B 3/23 |
| 11,122,160 | B1* | 9/2021 | Fardig | H04M 3/002 |
| 11,172,001 | B1* | 11/2021 | Puthucode Krishnamoorthy | G10L 13/08 |
| 2004/0059571 | A1* | 3/2004 | Ohtomo | H04M 9/082 704/226 |
| 2005/0213727 | A1* | 9/2005 | Nir | H04L 12/66 379/202.01 |
| 2005/0246170 | A1* | 11/2005 | Vignoli | G10L 21/0364 704/226 |
| 2006/0009977 | A1* | 1/2006 | Kato | G10L 13/10 704/260 |
| 2006/0227968 | A1* | 10/2006 | Chen | G10L 19/018 704/E19.009 |
| 2007/0217626 | A1* | 9/2007 | Sharma | G06T 1/005 381/100 |
| 2007/0291108 | A1* | 12/2007 | Huber | H04Q 11/00 348/E7.083 |
| 2008/0198779 | A1* | 8/2008 | Jaermyr | H04B 3/238 370/290 |
| 2008/0304653 | A1* | 12/2008 | Ghani | H04M 9/08 379/406.08 |
| 2009/0253418 | A1* | 10/2009 | Makinen | H04R 27/00 455/416 |
| 2010/0157990 | A1 | 6/2010 | Krzyzanowski et al. | |
| 2010/0191527 | A1* | 7/2010 | Matsuo | H04R 3/02 704/226 |
| 2011/0093273 | A1* | 4/2011 | Lee | H04L 65/4038 348/E7.083 |
| 2011/0166861 | A1* | 7/2011 | Wang | G10L 13/02 704/E13.011 |
| 2011/0249827 | A1* | 10/2011 | Eriksson | H03G 9/025 704/226 |
| 2011/0313762 | A1* | 12/2011 | Ben-David | G10L 13/08 704/270.1 |
| 2012/0203556 | A1* | 8/2012 | Villette | G10L 19/018 704/E21.02 |
| 2012/0213380 | A1* | 8/2012 | Mahe | H04M 9/082 381/71.8 |
| 2012/0214544 | A1* | 8/2012 | Shivappa | H04M 1/72457 455/556.1 |
| 2012/0239387 | A1* | 9/2012 | Ben-David | G10L 21/003 704/E19.01 |
| 2013/0132091 | A1* | 5/2013 | Skerpac | G06F 21/32 704/273 |
| 2013/0147902 | A1* | 6/2013 | Weiser | H04L 65/1104 348/E7.083 |
| 2013/0152139 | A1* | 6/2013 | Davis | H04H 60/27 725/61 |
| 2013/0204616 | A1* | 8/2013 | Aoki | H04M 3/566 704/226 |
| 2014/0067385 | A1* | 3/2014 | Oliveira | G10H 1/368 704/226 |
| 2014/0249809 | A1* | 9/2014 | Srinivasan | G10L 21/0208 704/226 |
| 2015/0179182 | A1* | 6/2015 | Vinton | G10L 19/032 704/226 |
| 2015/0294675 | A1* | 10/2015 | Hammarqvist | H04B 3/23 704/226 |
| 2015/0356978 | A1* | 12/2015 | Dickins | G10L 19/0208 704/226 |
| 2016/0064008 | A1* | 3/2016 | Graham | G10L 15/26 704/227 |
| 2016/0111111 | A1* | 4/2016 | Levitt | G10L 21/013 704/226 |
| 2016/0140952 | A1* | 5/2016 | Graham | G10L 13/033 704/260 |
| 2016/0267923 | A1* | 9/2016 | Goto | H04M 3/568 |
| 2018/0146370 | A1* | 5/2018 | Krishnaswamy | G10L 19/018 |
| 2019/0287513 | A1* | 9/2019 | Alameh | G10L 17/00 |
| 2019/0362719 | A1* | 11/2019 | Gruenstein | G10L 17/00 |
| 2019/0385629 | A1* | 12/2019 | Moravy | G06F 21/602 |
| 2020/0098380 | A1* | 3/2020 | Tai | G10L 13/08 |
| 2020/0302036 | A1* | 9/2020 | Khan | G06F 21/16 |
| 2020/0302423 | A1* | 9/2020 | Vijayaraghavan | G06Q 20/322 |
| 2020/0388297 | A1* | 12/2020 | Rudberg | G10L 25/84 |
| 2021/0050024 | A1* | 2/2021 | Wouters | G10L 19/125 |
| 2021/0050025 | A1* | 2/2021 | Huffman | G06N 3/045 |
| 2021/0118423 | A1* | 4/2021 | Ping | G10L 13/047 |
| 2021/0142782 | A1* | 5/2021 | Wolf | G10L 13/08 |
| 2021/0304783 | A1* | 9/2021 | Kons | G10L 17/06 |
| 2021/0366074 | A1* | 11/2021 | Beattie, Jr. | H04N 19/467 |
| 2022/0141341 | A1* | 5/2022 | Tu | H04M 3/568 379/202.01 |
| 2022/0206884 | A1* | 6/2022 | Wyss | G10L 13/04 |
| 2023/0058981 | A1* | 2/2023 | Tu | H04N 7/15 |

FOREIGN PATENT DOCUMENTS

| | | |
|---|---|---|
| CN | 112400158 | 2/2021 |
| TW | 201448589 | 12/2014 |

* cited by examiner

CONFERENCE TERMINAL AND ECHO CANCELLATION METHOD FOR CONFERENCE

CROSS-REFERENCE TO RELATED APPLICATION

This application claims the priority benefit of Taiwan application serial no. 110130678, filed on Aug. 19, 2021. The entirety of the above-mentioned patent application is hereby incorporated by reference herein and made a part of this specification.

BACKGROUND

Technical Field

The disclosure relates to a voice conference, particularly to a conference terminal and an echo cancellation method for a conference.

Description of Related Art

A remote conference allows people in different locations or spaces to have conversations. Also, conference-related equipment, protocols, and/or applications are well developed. It is worth noting that in actual situations, several people in the same space may participate in a teleconference or video conference using their own communication devices. When these communication devices talk together, a microphone of each device may receive sounds from speakers of many other devices. Thus, many unstable feedback mechanisms are formed, obvious howling is caused, and the progress of the conference may be affected. While there have been related algorithms for echo cancellation, in actual situations, the relative positions of the communication devices may change, thereby affecting delay time of echo cancellation. In addition, a speech signal is constantly changing. Even if echoes are canceled in the teleconference, it is difficult to immediately achieve a good convergence effect.

SUMMARY

An embodiment of the disclosure provides a conference terminal and an echo cancellation method for a conference, in which a watermark signal is used to accelerate convergence.

An echo cancellation method for a conference according to an embodiment of the disclosure is adapted to multiple conference terminals, and each conference terminal includes a sound receiver and a loudspeaker. The echo cancellation method includes (but not limited to) the following. A synthetic speech signal is received. The synthetic speech signal includes a user speech signal of a speaking party corresponding to a first conference terminal of the conference terminals and an audio watermark signal corresponding to the first conference terminal. One or more delay times corresponding to the audio watermark signal are detected in a received audio signal. The received audio signal is recorded through the sound receiver of a second conference terminal of the conference terminals. An echo in the received audio signal is canceled according to the delay time.

A conference terminal according to an embodiment of the disclosure includes (but not limited to) a sound receiver, a loudspeaker, a communication transceiver, and a processor. The sound receiver is configured to perform recording and obtain a received audio signal of a speaking party. The loudspeaker is configured to play a sound. The communication transceiver is configured to transmit or receive data. The processor is coupled to the sound receiver, the loudspeaker and the communication transceiver. The processor is configured to receive a synthetic speech signal, detect one or more delay times corresponding to an audio watermark signal in the received audio signal, and cancel an echo in the received audio signal according to the delay time. The synthetic speech signal includes a user speech signal of the speaking party corresponding to another conference terminal of multiple conference terminals and an audio watermark signal corresponding to the another conference terminal.

Based on the foregoing, in the conference terminal and the echo cancellation method for a conference according to an embodiment of the disclosure, echo cancellation is performed using a known and fixed audio watermark signal, thereby reducing a convergence time required for the echo cancellation. In addition, the audio watermark signal can be prevented from being heard by a user, and the conference can proceed smoothly.

To make the aforementioned more comprehensible, several embodiments accompanied with drawings are described in detail as follows.

DESCRIPTION OF THE EMBODIMENTS

Figure 1:
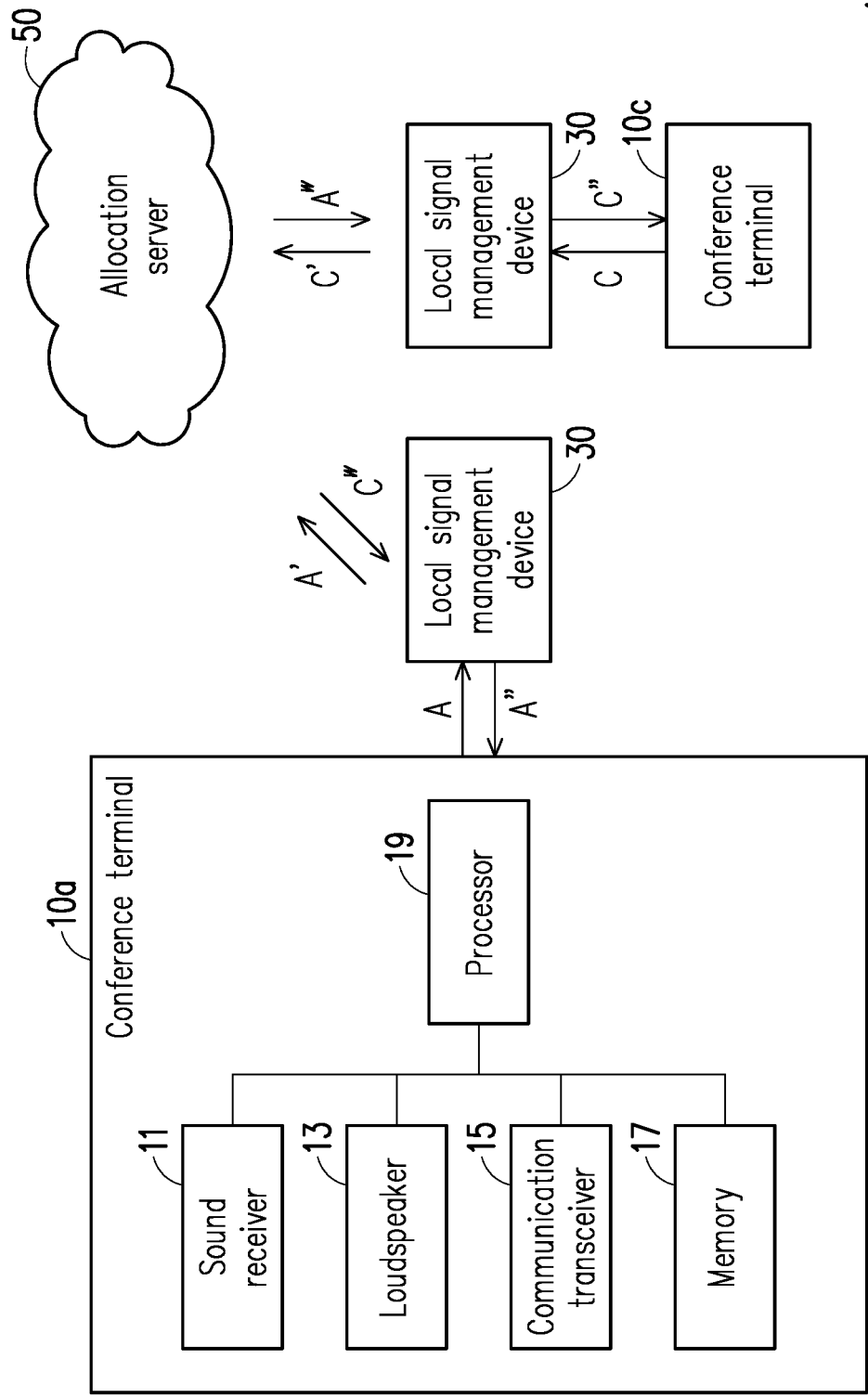
FIG. 1 is a schematic diagram of a conference system according to an embodiment of the disclosure.

FIG. 1 is a schematic diagram of a conference system 1 according to an embodiment of the disclosure. Referring to FIG. 1, the conference system 1 includes (but not limited to) multiple conference terminals 10a and 10c, multiple local signal management devices 30, and an allocation server 50.

Each of the conference terminals 10a and 10c may be a corded phone, a mobile phone, a tablet computer, a desktop computer, a notebook computer, or a smart speaker. Each of the conference terminals 10a and 10c includes (but not limited to) a sound receiver 11, a loudspeaker 13, a communication transceiver 15, a memory 17, and a processor 19.

The sound receiver 11 may be a microphone of a dynamic type, a condenser type, or an electret condenser type. The sound receiver 11 may also be a combination of other electronic component capable of receiving sound waves (for example, human voice, environmental sound, and machine operation sound) and converting them into audio signals, an analog-to-digital converter, a filter, and an audio processor. In one embodiment, the sound receiver 11 is configured to receive/record a sound from a speaking party and obtain a received audio signal. The received audio signal may include voice of the speaking party, sound emitted by the loudspeaker 13, and/or other environmental sounds.

The loudspeaker 13 may be a speaker or a megaphone. In one embodiment, the loudspeaker 13 is configured to play a sound.

The communication transceiver 15 is, for example, a transceiver supporting a wired network such as Ethernet, a fiber optic network, or a cable network (in which the transceiver may include components such as (but not limited to) a connection interface, a signal converter, and a communication protocol processing chip). Alternatively, the communication transceiver 15 may be a transceiver supporting a wireless network such as Wi-Fi, a fourth generation (4G), fifth generation (5G) or later generation mobile network (in which the transceiver may include components such as (but not limited to) an antenna, a digital-to-analog/analog-to-digital converter, and a communication protocol processing chip). In one embodiment, the communication transceiver 15 is configured to transmit or receive data.

The memory 17 may be any type of fixed or portable random access memory (RAM), read-only memory (ROM), flash memory, hard disk drive (HDD), solid-state drive (SSD) or similar component. In one embodiment, the memory 17 is configured to record a program code, a software module, a configuration arrangement, data (such as an audio signal or a delay time), or a file.

The processor 19 is coupled to the sound receiver 11, the loudspeaker 13, the communication transceiver 15 and the memory 17. The processor 19 may be a central processing unit (CPU), a graphics processing unit (GPU), or other programmable general purpose or special purpose microprocessor, a digital signal processor (DSP), a programmable controller, a field programmable gate array (FPGA), an application-specific integrated circuit (ASIC) or other similar component or a combination of the foregoing. In one embodiment, the processor 19 is configured to perform all or some of operations of the conference terminal 10a or 10c to which the processor 19 belongs, and may load and execute various software modules, files and data recorded in the memory 17.

The local signal management device 30 is connected to the conference terminal 10a or the conference terminal 10c via a network. The local signal management device 30 may be a computer system, a server, or a signal processing device. In one embodiment, the conference terminal 10a or the conference terminal 10c may serve as the local signal management device 30. In another embodiment, the local signal management device 30 may serve as an independent relay device different from the conference terminals 10a and 10c. In some embodiments, the local signal management device 30 includes (but not limited to) the communication transceiver 15, the memory 17 and the processor 19 that are identical or similar to those mentioned above, and the implementation modes and functions of these components will not be repeated.

In addition, in one embodiment, it is assumed that the conference terminals connected to the same local signal management device 30 are located in the same region (for example, specific space, area, compartment, or floor in a building). The conference terminals 10a and 10c in FIG. 1 are respectively located in different regions. However, the number of conference terminals connected to any local signal management device 30 is not limited to one.

The allocation server 50 is connected to the local signal management device 30 via a network. The allocation server 50 may be a computer system, a server, or a signal processing device. In one embodiment, the conference terminal 10a or the conference terminal 10c or the local signal management device 30 may serve as the allocation server 50. In another embodiment, the allocation server 50 may serve as an independent cloud server different from the conference terminals 10a and 10c or the local signal management device 30. In some embodiments, the allocation server 50 includes (but not limited to) the communication transceiver 15, the memory 17 and the processor 19 that are identical or similar to those mentioned above, and the implementation modes and functions of these components will not be repeated.

In the following, the method according to an embodiment of the disclosure will be described with reference to the devices, components, and modules in the conference system 1. The steps in this method may be adjusted according to actual situations and are not limited to those described herein.

It should be noted that, for the convenience of description, the same components may implement the same or similar operations, and description thereof will not be repeated. For example, since the conference terminals 10a and 10c may serve as the local signal management device 30 or the allocation server 50, and the local signal management device 30 may also serve as the allocation server 50, in some embodiments, the processor 19 of each of the conference terminals 10a and 10c, the local signal management device 30 and the allocation server 50 may implement the method identical or similar to that according to an embodiment of the disclosure.

Figure 2:
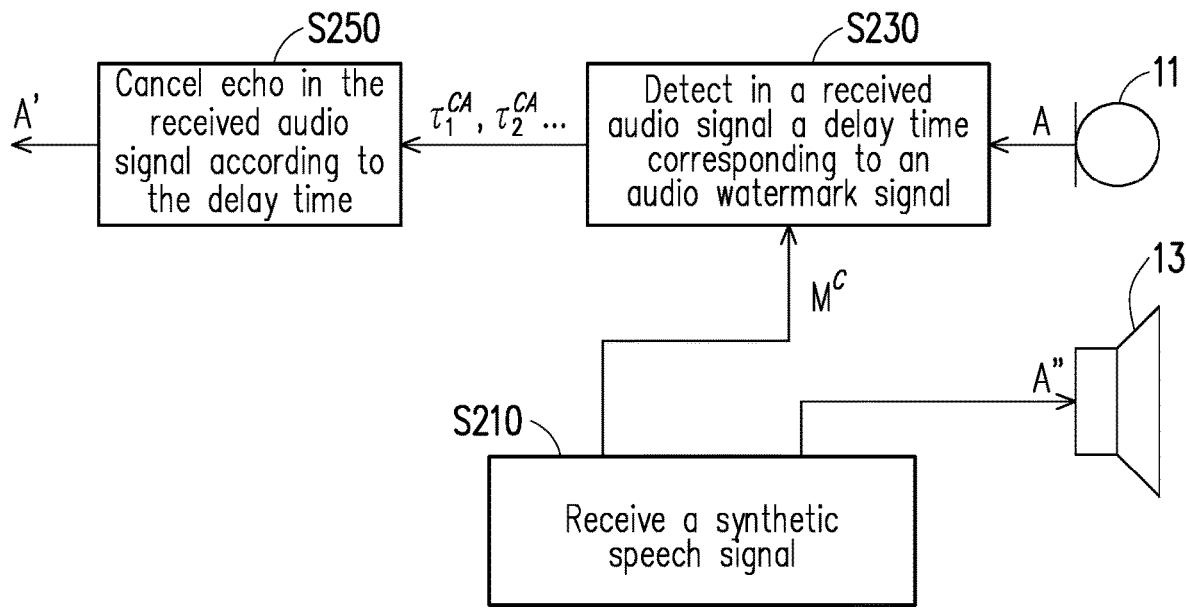
FIG. 2 is a flowchart of an echo cancellation method for a conference according to an embodiment of the disclosure.

FIG. 2 is a flowchart of an echo cancellation method for a conference according to an embodiment of the disclosure. Referring to FIG. 1 and FIG. 2, it is assumed that a voice conference is established between the conference terminals 10a and 10c. For example, when a conference is established through video software, voice communication software, or a phone call, a speaking party may start talking. The processor 19 of the conference terminal 10a may receive a synthetic speech signal $C^W$ through the communication transceiver 15 (step S210). Specifically, the synthetic speech signal $C^W$ includes a user speech signal C' of the speaking party corresponding to the conference terminal 10c and an audio watermark signal $M^C$ corresponding to the conference terminal 10c.

Figure 3:
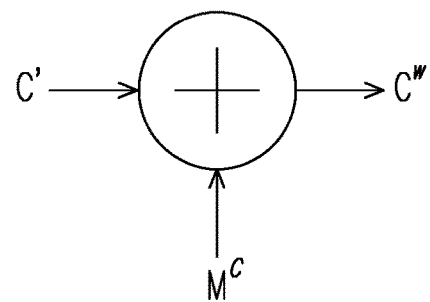
FIG. 3 is a schematic diagram illustrating generation of a synthetic speech signal according to an embodiment of the disclosure.

For example, FIG. 3 is a schematic diagram illustrating generation of the synthetic speech signal $C^W$ according to an embodiment of the disclosure. Referring to FIG. 3, the user speech signal C' is generated by the conference terminal 10c through recording using the sound receiver 11 of the conference terminal 10c. The user speech signal C' may include voice of the speaking party, sound played by the loudspeaker 13, and/or other environmental sounds. The allocation server 50 may add the audio watermark signal $M^C$ to the user speech signal C' of the speaking party corresponding to the conference terminal 10a by spread spectrum, echo hiding, phase encoding or the like in a time domain, thereby forming the synthetic speech signal $C^W$. Alternatively, the allocation server 50 may add the audio watermark signal $M^C$ to the user speech signal C' of the speaking party corresponding to the conference terminal 10a by carrier wave modulation, frequency band subtraction or the like in a frequency domain, thereby forming the synthetic speech signal $C^W$. It should be noted that the embodiment of the disclosure does not limit the algorithm of watermark embedding.

In one embodiment, the audio watermark signal $M^C$ has a frequency of higher than 16 kilohertz (kHz), so as to be prevented from being heard by humans. In another embodiment, the audio watermark signal $M^C$ may have a frequency of lower than 16 kHz.

In one embodiment, the audio watermark signal $M^C$ is used to identify the conference terminal 10c. For example, the audio watermark signal $M^C$ is a sound, an image, or a code that records an identification code of the conference terminal 10c. However, in some embodiments, the content of the audio watermark signal $M^C$ is not limited. In addition, generation of an audio watermark signal $M^A$, a synthetic speech signal $A^W$, and other audio watermark signals and synthetic speech signals of other conference devices can be understood with reference to the foregoing description and will be omitted.

The allocation server 50 transmits the synthetic speech signal $C^W$ to the local signal management device 30. The local signal management device 30 takes the synthetic speech signal $C^W$ as an output audio signal A" expected to be played by the conference terminal 10a, and accordingly transmits the output audio signal A" to the conference terminal 10a, such that the conference terminal 10a receives the synthetic speech signal $C^W$.

The processor 19 of the conference terminal 10a may play the output audio signal A" (the synthetic speech signal $C^W$ in the present embodiment) through the loudspeaker 13. The processor 19 of the conference terminal 10a may perform recording or sound collection through the sound receiver 11 and obtain a received audio signal A.

The processor 19 of the conference terminal 10a may detect one or more delay times corresponding to the audio watermark signal $M^C$ in the received audio signal A (step S230). Specifically, it is assumed that an audio watermark signal corresponding to another conference terminal (for example, the conference terminal 10c) is known to the conference terminal 10a. It is worth noting that the processor 19 of the conference terminal 10a may, according to the output audio signal A" played by the loudspeaker 13 of all or some of the conference terminals (for example, the conference terminal 10a in the present embodiment) in the region where the conference terminal 10a is located, cancel an echo in the received audio signal A received by the sound receiver 11 of the conference terminal 10a.

The output audio signal A" includes the synthetic speech signal $C^W$. In one embodiment, if it is desired to detect a delay time corresponding to the synthetic speech signal $C^W$ in the received audio signal A, the processor 19 of the conference terminal 10a may determine initial delay times $\tau_1^{CA}$ and $\tau_2^{CA}$ (assuming that two times are corresponded to; however, the disclosure is not limited thereto) according to a correlation between the received audio signal A and the audio watermark signal $M^C$. The initial delay times $\tau_1^{CA}$ and $\tau_2^{CA}$ correspond to a relatively high degree of correlation. For example, the processor 19 may estimate an initial delay time for the audio watermark signal $M^C$ to be transmitted to the sound receiver 11 via the loudspeaker 13 according to a peak value (that is, having a highest degree of correlation) in cross-correlation between the received audio signal A and the audio watermark signal $M^C$. Since there may be not only one peak value, the number of the initial delay times $\tau_1^{CA}$ and $\tau_2^{CA}$ may be more than one. It should be noted that there are many algorithms for estimating the delay time, and the embodiment of the disclosure is not limited thereto.

In one embodiment, according to the initial delay times $\tau_1^{CA}$ and $\tau_2^{CA}$, the processor 19 may generate one or more initial delay signals $C^W(n-\tau_1^{CA})$ and $C^W(n-\tau_2^{CA})$ corresponding to the user speech signal C'. The delay times of the initial delay signals $C^W(n-\tau_1^{CA})$ and $C^W(n-\tau_2^{CA})$ relative to the user speech signal C' are the initial delay times $\tau_1^{CA}$ and $\tau_2^{CA}$. It is worth noting that in a time-variant system, the delay time of an entire delivery system varies with a change in space. Therefore, the processor 19 may define a delay time of the synthetic speech signal $C^W$ or the audio watermark signal $M^C$ as an unknown delay time $\Delta t^C$. The received audio signal A includes an audio signal a(n) of a speaking party and a synthetic speech signal $C^W(n-\Delta t^C)$ belonging to the conference terminal 10c. The purpose of echo cancellation is to find the correct delay time $\Delta t^C$ and accordingly cancel redundant sound (for example, the synthetic speech signal $C^W(n-\Delta t^C)$), so that only the audio signal a(n) of the speaking party remains in a user speech signal A'.

The processor 19 may estimate an echo path according to the initial delay signals $C^W(n-\tau_1^{CA})$ and $C^W(n-\tau_2^{CA})$. Specifically, the audio watermark signal $M^C$ is delayed by a converged delay time after passing through the echo path, and the echo path is a channel between the sound receiver 11 and the loudspeaker 13. The processor 19 may apply the initial delay signals $C^W(n-\tau_1^{CA})$ and $C^W(n-\tau_2^{CA})$ to various types of adaptive filters (for example, a least mean squares (LMS) filter, a subband adaptive filter (SAF), or a normalized least mean squares (NLMS) filter), and accordingly estimate an impulse response of the echo path and cause the filter to converge. When the filter converges to a steady state, the processor 19 estimates, using a filter coefficient in the steady state, the synthetic speech signal $C^W(n-\Delta t^C)$ delayed by passing through the echo path, and accordingly obtains the delay time $\Delta t^C$.

According to the delay time $\Delta t^C$, the processor 19 of the conference terminal 10a may cancel an echo in the received audio signal A (step S250). Specifically, it is assumed that the echo in the received audio signal A is the synthetic speech signal $C^W(n-\Delta t^C)$. Since the synthetic speech signal $C^W$ and $\Delta t^C$ are both known, the processor 19 may generate the synthetic speech signal $C^W(n-\Delta t^C)$ and cancel the synthetic speech signal $C^W(n-\Delta t^C)$ with respect to the received audio signal A, thereby achieving echo cancellation.

It should be noted that the embodiment of the disclosure is not limited to a one-to-one conference as shown in FIG. 1. Another embodiment is described in the following.

Figure 4:
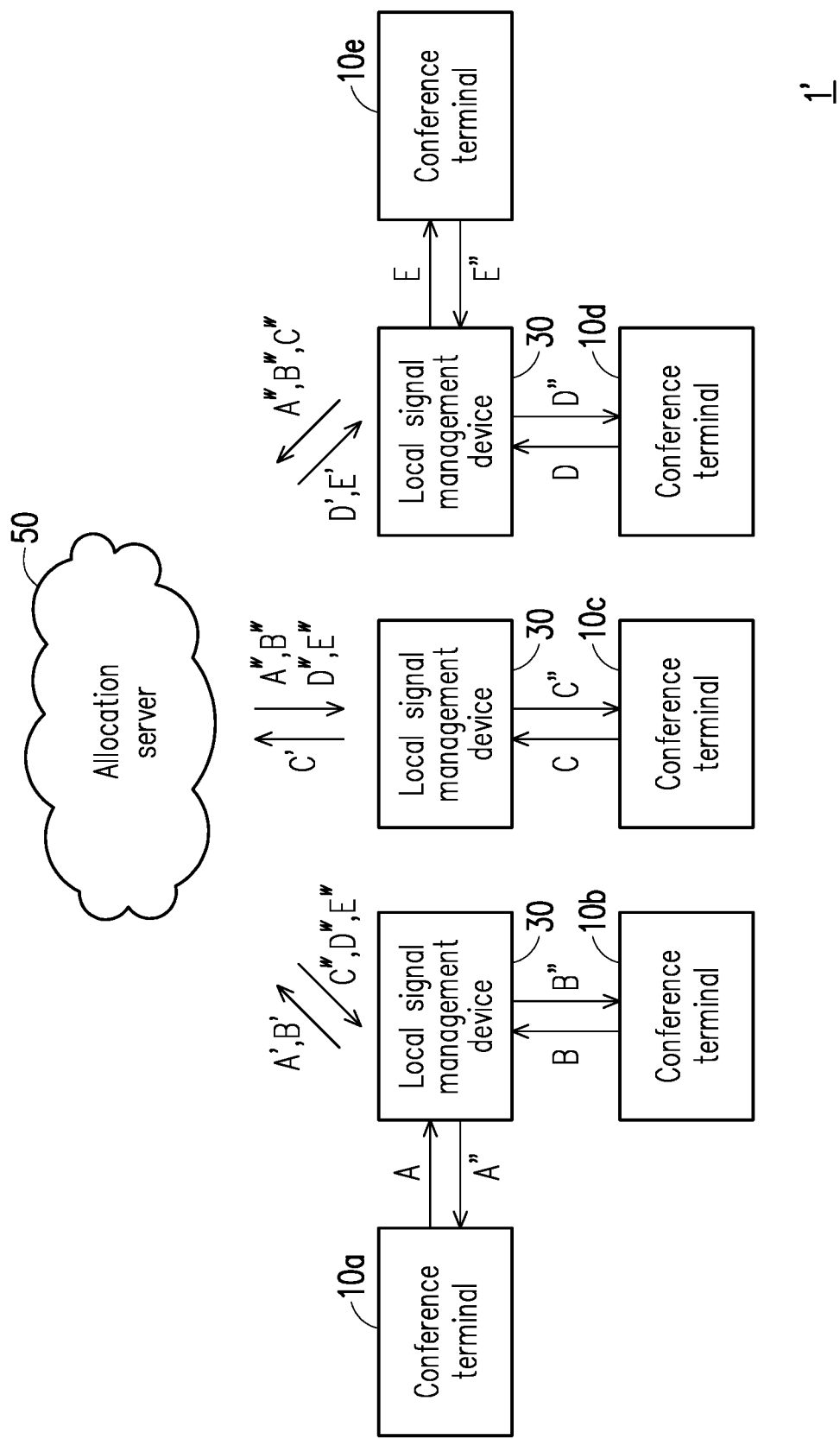
FIG. 4 is a schematic diagram of a conference system according to an embodiment of the disclosure.

FIG. 4 is a schematic diagram of a conference system 1' according to an embodiment of the disclosure. Referring to FIG. 4, the conference system 1' includes (but not limited to) multiple conference terminals 10a to 10e, multiple local signal management devices 30, and the allocation server 50.

The implementation modes and functions of the conference terminals 10b to 10e, the local signal management device 30, and the allocation server 50 can be understood with reference to the description of FIG. 1 to FIG. 3 concerning the conference terminal 10a, the local signal management device 30 and the allocation server 50, and will be omitted.

In the present embodiment, different regions are defined according to the local signal management device 30. The conference terminals 10a and 10b are in a first region, the conference terminal 10c is in a second region, and the conference terminals 10d and 10e are in a third region. The allocation server 50 may add audio watermark signals $M^A$ to $M^E$ respectively to user speech signals A' to E' of the speaking parties corresponding to the conference terminals 10a to 10e, thereby forming synthetic speech signals $A^W$ to $E^W$. The allocation server 50 transmits the synthetic speech signals $C^W$ to $E^W$ from the second region and the third region to the local signal management device 30 in the first region, transmits the synthetic speech signals $A^W$, $B^W$, $D^W$ and $E^W$ from the first region and the third region to the local signal management device 30 in the second region, and transmits the synthetic speech signals $A^W$ to $C^W$ from the first region and the second region to the local signal management device 30 in the third region.

It is worth noting that a difference from FIG. 1 is that the output audio signal A" of the conference terminal 10a in FIG. 4 may include the synthetic speech signals $C^W$ to $E^W$.

Therefore, the processor 19 of the conference terminal 10a further detects one or more delay times corresponding to the audio watermark signals $M^D$ and $M^E$ in addition to the audio watermark signal $M^C$ in the received audio signal A.

Figure 5:
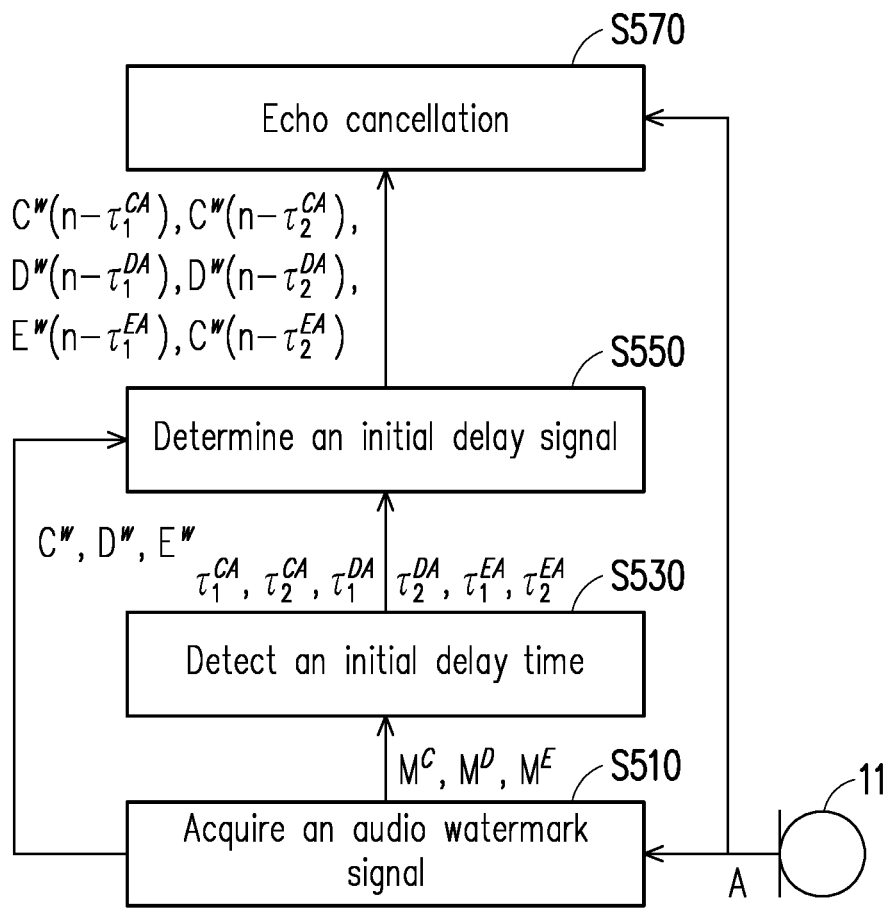
FIG. 5 is a flowchart of an echo cancellation method for a conference according to an embodiment of the disclosure.

Specifically, FIG. 5 is a flowchart of an echo cancellation method for a conference according to an embodiment of the disclosure. Referring to FIG. 5, the processor 19 of the conference terminal 10a obtains the audio watermark signals $M^C$ to $M^E$ (step S510). The audio watermark signals $M^C$ to $M^E$ may be pre-stored, entered by the user or downloaded from the Internet. The processor 19 detects the initial delay times $\tau_1^{CA}$, $\tau_2^{CA}$, $\tau_1^{DA}$, $\tau_2^{DA}$, $\tau_1^{EA}$, and $\tau_2^{EA}$ of the audio watermark signals $M^C$ to $M^E$ in the received audio signal A recorded by the sound receiver 11 (step S530) (assuming that each audio watermark signal corresponds to two delay times). According to the initial delay times $\tau_1^{CA}$, $\tau_2^{CA}$, $\tau_1^{DA}$, $\tau_2^{DA}$, $\tau_1^{EA}$ and $\tau_2^{EA}$, the processor 19 determines the initial delay signals $C^W(n-\tau_1^{CA})$, $C^W(n-\tau_2^{CA})$, $D^W(n-\tau_1^{DA})$, $D^W(n-\tau_2^{DA})$, $E^W(n-\tau_1^{EA})$, and $E^W(n-\tau_2^{EA})$ of the audio watermark signals $M^C$ to $M^E$ (step S550). The processor 19 cancels, in the received audio signal A, the initial delay signals $C^W(n-\tau_1^{CA})$, $C^W(n-\tau_2^{CA})$, $D^W(n-\tau_2^{DA})$ $D^W(n-\tau_2^{DA})$, $E^W(n-\tau_1^{EA})$ and $E^W(n-\tau_2^{EA})$, so as to reduce a convergence time of echo cancellation, and further cancel the components in the received audio signal A that belong to the synthetic speech signals $C^W$ to $E^W$ (step S570).

In summary, in the conference terminal and the echo cancellation method for a conference according to an embodiment of the disclosure, a delay time of a synthetic speech signal to be canceled is estimated using a known audio watermark signal, and synthetic speech signals of other conference devices are canceled accordingly. In an embodiment of the disclosure, an initial delay time corresponding to the audio watermark signal is firstly obtained, and a convergence time of echo cancellation can be reduced. Even if conference devices have a constantly changing positional relationship therebetween, an expected convergence effect can be achieved.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An echo cancellation method for a conference, adapted to a plurality of conference terminals each comprising a sound receiver and a loudspeaker, the echo cancellation method comprising:
   receiving a synthetic speech signal, wherein the synthetic speech signal comprises a user speech signal of a speaking party corresponding to a first conference terminal of the plurality of conference terminals and an audio watermark signal corresponding to the first conference terminal;
   detecting at least one delay time corresponding to the audio watermark signal in a received audio signal relative to the synthetic speech signal, wherein the received audio signal is recorded through the sound receiver of a second conference terminal of the plurality of conference terminals, and detecting the at least one delay time of the audio watermark signal comprises:
      generating at least one initial delay signal corresponding to the user speech signal according to the at least one initial delay time, wherein a delay time of the at least one initial delay signal relative to the user speech signal is the at least one initial delay time between the audio watermark signal in the received audio signal and the audio watermark signal in the synthetic speech signal; and
   estimating an echo path according to the at least one initial delay signal, wherein the audio watermark signal is delayed by the at least one initial delay time after passing through the echo path, and the echo path is a channel between the sound receiver and the loudspeaker; and
   canceling an echo in the received audio signal according to the at least one delay time.

2. The echo cancellation method for a conference according to claim 1, wherein detecting the at least one delay time corresponding to the audio watermark signal in the received audio signal comprises:
   determining the at least one initial delay time according to a correlation between the received audio signal and the audio watermark signal, wherein the at least one initial delay time corresponds to a relatively high degree of the correlation.

3. The echo cancellation method for a conference according to claim 1, wherein the synthetic speech signal further comprises a second user speech signal of the speaking party corresponding to a third conference terminal of the plurality of conference terminals, and a second audio watermark signal corresponding to the third conference terminal, and the echo cancellation method further comprises:
   detecting at least one delay time corresponding to the second audio watermark signal in the received audio signal.

4. The echo cancellation method for a conference according to claim 1, wherein the audio watermark signal has a frequency of higher than 16 kilohertz (kHz).

5. The echo cancellation method for a conference according to claim 1, wherein canceling the echo in the received audio signal comprises:
   generating at least one second synthetic speech signal which is the synthetic speech signal with the at least one delay time; and
   canceling the at least one second synthetic speech signal from the received audio signal.

6. The echo cancellation method for a conference according to claim 1, wherein estimating the echo path comparing:
   estimating an impulse response of the echo path by applying the at least one initial delay signal to an adaptive filter.

7. The echo cancellation method for a conference according to claim 1, further comprising:
   playing, through the loudspeaker, the synthetic speech signal received via a network.

8. A conference terminal comprising:
   a sound receiver, configured to perform recording and obtain a received audio signal of a speaking party corresponding thereto;
   a loudspeaker, configured to play a sound;
   a communication transceiver, configured to transmit or receive data; and
   a processor, coupled to the sound receiver, the loudspeaker and the communication transceiver, and configured to:
      receive a synthetic speech signal through the communication transceiver, wherein the synthetic speech signal comprises a user speech signal of the speaking party corresponding to a second conference terminal and an audio watermark signal corresponding to the second conference terminal;
detect at least one delay time corresponding to the audio watermark signal in the received audio signal relative to the synthetic speech signal, and the processor is further configured to
generate at least one initial delay signal corresponding to the user speech signal according to at least one initial delay time, wherein a delay time of the at least one initial delay signal relative to the user speech signal is the at least one initial delay time between the audio watermark signal in the received audio signal and the audio watermark signal in the synthetic speech signal; and
estimate an echo path according to the at least one initial delay signal, wherein the audio watermark signal is delayed by the at least one initial delay time after passing through the echo path, and the echo path is a channel between the sound receiver and the loudspeaker; and
cancel an echo in the received audio signal according to the at least one delay time.

9. The conference terminal according to claim 8, wherein the processor is further configured to:
determine the at least one initial delay time according to a correlation between the received audio signal and the audio watermark signal, wherein the at least one initial delay time corresponds to a relatively high degree of the correlation.

10. The conference terminal according to claim 8, wherein the synthetic speech signal further comprises a second user speech signal of the speaking party corresponding to a third conference terminal, and a second audio watermark signal corresponding to the third conference terminal, and the processor is further configured to:
detect at least one delay time corresponding to the second audio watermark signal in the received audio signal.

11. The conference terminal according to claim 8, wherein the audio watermark signal has a frequency of higher than 16 kHz.

12. The conference terminal according to claim 8, wherein the processor is further configured to:
generate at least one second synthetic speech signal which is the synthetic speech signal with the at least one delay time; and
cancel the at least one second synthetic speech signal from the received audio signal.

13. The conference terminal according to claim 8, wherein the processor is further configured to:
estimate an impulse response of the echo path by applying the at least one initial delay signal to an adaptive filter.

14. The conference terminal according to claim 8, wherein the processor is further configured to:
play, through the loudspeaker, the synthetic speech signal received via a network.

* * * * *